United States Patent
Jung et al.

(10) Patent No.: US 8,849,263 B2
(45) Date of Patent: Sep. 30, 2014

(54) EFFICIENT HANDOVER EXECUTION METHOD OF TERMINAL IN BROADBAND WIRELESS ACCESS SYSTEM INCLUDING MULTIPLE FEMTO BASE STATIONS

(75) Inventors: In Uk Jung, Anyang-si (KR); Jin Lee, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 429 days.

(21) Appl. No.: 13/379,344

(22) PCT Filed: Jun. 21, 2010

(86) PCT No.: PCT/KR2010/004008
§ 371 (c)(1), (2), (4) Date: Mar. 2, 2012

(87) PCT Pub. No.: WO2010/147446
PCT Pub. Date: Dec. 23, 2010

(65) Prior Publication Data
US 2012/0165021 A1    Jun. 28, 2012

Related U.S. Application Data

(60) Provisional application No. 61/218,433, filed on Jun. 19, 2009, provisional application No. 61/223,710, filed on Jul. 8, 2009.

(51) Int. Cl.
*H04M 3/42* (2006.01)
*H04W 36/00* (2009.01)
*H04W 84/04* (2009.01)

(52) U.S. Cl.
CPC ........ *H04W 36/0055* (2013.01); *H04W 84/045* (2013.01)
USPC ........... 455/415; 455/437; 455/436; 455/440; 455/444

(58) Field of Classification Search
CPC ...................................................... H04W 52/40
USPC ....................................................... 455/436
See application file for complete search history.

(56) References Cited

U.S. PATENT DOCUMENTS

| 5,164,958 | A  | * | 11/1992 | Omura ........................... 375/140 |
| 7,929,676 | B2 | * | 4/2011  | Davis et al. ............... 379/201.02 |
| 2007/0171870 | A1 |   | 7/2007  | Oba et al. |
| 2009/0247181 | A1 | * | 10/2009 | Palanki et al. ............. 455/452.2 |

FOREIGN PATENT DOCUMENTS

| KR | 1020050101238 | 10/2005 |
| KR | 1020080104051 | 11/2008 |

* cited by examiner

*Primary Examiner* — Charles Appiah
*Assistant Examiner* — Randy Peaches
(74) *Attorney, Agent, or Firm* — Lee, Hong, Degerman, Kang & Waimey

(57) ABSTRACT

The present invention relates to methods for performing fast handover by a terminal in an environment in which multiple femto base stations exist. A method for performing handover by a terminal includes transmitting, to a serving femto base station, a message for requesting seamless handover within a group including multiple femto base stations, the serving femto base station belonging to the group; receiving, from the serving femto base station, first command message including power information and allocation information; broadcasting an uplink signal that is applied with transmission power indicated by the power information, through an uplink resource indicated by the allocation information; receiving second command messages including measurements of the uplink signal measured by the multiple femto base stations from the serving femto base stations; and performing network re-entry to a target base station among the femto base stations.

11 Claims, 5 Drawing Sheets

EFFICIENT HANDOVER EXECUTION METHOD OF TERMINAL IN BROADBAND WIRELESS ACCESS SYSTEM INCLUDING MULTIPLE FEMTO BASE STATIONS

CROSS-REFERENCE TO RELATED APPLICATIONS

This application is the National Stage filing under 35 U.S.C. 371 of International Application No. PCT/KR2010/004008, filed on Jun. 21, 2010, which claims the benefit of U.S. Provisional Application Ser. Nos. 61/223,710, filed on Jul. 8, 2009, and 61/218,433, filed on Jun. 19, 2009, the contents of which are all incorporated by reference herein in their entirety.

FIELD OF THE INVENTION

The present invention relates to a broadband wireless access system and, more particularly, to a fast handover execution method of a terminal in an environment, wherein multiple femto base stations exist.

BACKGROUND ART

A femto base station corresponds to a type of base station, which corresponds to a small sized version of a macro base station that can perform most of the functions of the macro base station, and which may be installed in a cover area of the macro base station or in a shadow area that cannot be covered by the macro base station. The femto base station is equipped with a network configuration that can be independently operated. And, as compared to relay base stations, a remarkably larger number of femto base stations may be installed in downtown areas or indoor areas.

FIG. 1 corresponds to a structural view of a wireless communication system additionally including a femto base station.

As shown in FIG. 1, the wireless communication system additionally including a femto base station includes a femto base station (110), a macro base station, a femto network gateway (hereinafter referred to as "FNG") (130), an access service network (hereinafter referred to as "ASN") (140), and a connectivity service network (hereinafter referred to as "CSN") (150). Herein, the macro base station refers to a general base station that is included in the related art wireless communication system.

The femto base station (110) directly accesses a TCP/IP (transmission control protocol/internet protocol) network and operates independently, just as the macro base station. Herein, it is assumed that the coverage of the femto base station (110) is within range of approximately 0.1~30 m. And, it is also assumed that one femto base station (110) may accommodate about 10~20 terminals. Herein, the femto base station (110) may either use the same frequency as that of the macro base station or use a different frequency (in case of Inter FA).

The femto base station (110) is connected to the macro base station through an R1 interface, thereby being capable of receiving a downlink channel of the macro base station. And, the femto base station (110) may transmit a control signal to the macro base station.

The femto base station (110) is capable of covering indoor or shadow areas that cannot be covered by the macro base station and may also support a high data transmission rate. The femto base station (110) may be installed within the macrocell in an overlay format, or the femto base station (110) may also be installed in a non-overlay format in an area that cannot be covered by the macro base station.

The femto base station (110) may be divided into two different types. A first type corresponds to a CSG (closed subscriber group) femto base station, and a second type corresponds to an OSG (open subscriber group) femto base station. The CSG femtocell base station groups terminals that can access the CSG femto base station and assigns CSG ID (identification) to the accessing terminals. Thereafter, the terminals that are assigned with a CSG ID may be differentiated from the terminals that are not assigned with a CSG ID when accessing the CSG femto base station. The OSG femto base station corresponds to a base station that allows the access of all terminals.

The FNG (130) is a gateway that is configured to control the femto base station (110). Herein, the FNG (130) is respectively connected to the ASN (140) and the CSN (150) through an Rx interface and an Ry interface. The femto base station (110) may receive service from the CSN (150) through the FNG (230), and the terminals that are connected to the femto base station (110) may be serviced with functions, such as certification, IMS, and so on, from the FNG (130) or the CSN (150).

The CSN (150) provides the terminals with connections to application services, such as the internet, VoIP, and so on, and also provides the terminal with certification (or authentication) and charging functions. And, the ASN (140) controls the macro base station and manages the connection between the macro base station and the CSN (150).

Meanwhile, the CSG type femto base station may be categorized into 2 different types depending upon the accessibility of a non-member terminal, i.e., a terminal that has not been assigned with a CSG ID.

A CSG-Closed Femto ABS corresponds to a femto base station type that authorizes (or allows) access to member terminals only. Accordingly, a terminal may store CSG-Closed Femto ABS identifiers that allow the access of the corresponding terminal in a White list.

Meanwhile, a CSG-Open Femto ABS provides first priority support to member terminals. And, when surplus support remains, the CSG-Open Femto ABS may also allow access to non-member terminals. However, the service level that is provided to the non-member terminals may be differentiated from the service that is provided to the member terminals.

In the mobile communication systems that presently uses the Femto base stations, it is assumed that the categorization for the CSG type femto base stations is fixed to the two different types that are described above with respect to the access authorization level provided to the non-member terminals. Herein, the distinction for CSG Open/Closed femto base stations may be known from an AAI_SCD (Advanced Air Interface System Configuration Descriptor) through partition information.

Hereinafter, a handover will be described in detail.

A Handover (HO) refers to a shift (or repositioning) of a terminal from a wireless interface of one particular base station to a wireless interface of another base station. Hereinafter, a handover procedure within an IEEE 802.16m system.

Presently, in an IEEE 802.16m, the HO is broadly divided into 3 different procedures: HO decision and Initiation, HO preparation, and HO Execution. Prior to performing (or executing) the above-mentioned 3 procedures, the terminal is required to perform a procedure of gathering information on the neighboring (or surrounding) base stations. Such scanning procedure is similar to the scanning procedure performed in a general IEEE 802.16e network. However, when there exists a section during which the terminal does not communicate with the S-ABS, this section may be used for scanning the neighboring base stations.

During the HO decision and Initiation procedure, the terminal or the base station may initiate the handover procedure. When the terminal initiates the handover procedure, the terminal transmits a handover request message (AAI_HO-REQ) message to the serving base station. At this point, depending upon the decision of the base station, the terminal decides whether or not to perform (or execute) EBB handover.

During the HO preparation procedure, a serving base station (S-ABS) and a target base station (T-ABS) exchange terminal information with one another, and the serving base station (S-ABS) and the target base station (T-ABS) negotiate conditions for the HO execution procedure that will be carried out later on and also negotiate resources (dedicated code, STID, security parameters etc) that are to be allocated to the terminal. And, in some cases, the S-ABS may provide the terminal with multiple T-ABSs. When the terminal initiates the HO, the terminal requests for an HO through an AAI-HO-REQ message. Thereafter, the terminal receives the above-described information from the base station through a handover command (AAI_HO-CMD) message. At this point, an action time and a disconnect time in included in the AAI_HO-CMD message, thereby being transmitted. Herein, the action time refers to a time during which the terminal performs network re-entry, and the disconnect time refers to a time during which the S-ABS stops performing uplink/downlink (DL/UL) resource allocation to the user equipment.

The HO execution procedure corresponds to a time during which a network re-entry to the T-ABS is performed in accordance with the action time. At this point, network re-entry may be performed through a CDMA ranging or immediate ranging request (AAI_RNG-REQ) message. When the terminal performs EBB (Entry Before Brake), the terminal may consistently (or continuously) information to the S-ABS at a pre-determined AI (available interval), and the terminal may perform network re-entry to the target base station at a pre-determined UAI (unavailable interval). When the terminal performs BBE (Break Before Entry), the AI or UAI remains undecided, and the procedure is similar to a Hard Handover process of a general IEEE 802.16e network.

Hereinafter, the above-described handover procedure will be described in more detail with reference to FIG. 2.

FIG. 2 illustrates an exemplary handover procedure in a general IEEE 802.16m system.

Referring to FIG. 2, the handover procedure may be initiated by the serving base station (S201a), or the handover procedure may be initiated by the terminal (S201b). When the handover procedure is initiated by the serving base station, in order to request for a handover to the serving base station, the terminal may perform a process of transmitting a handover request (AAI_HO-REQ) message to the serving base station. However, the serving base station may initiate the handover procedure without having to perform the process of receiving the corresponding message from the terminal.

When the terminal receives the handover command (AAI_HO-CMD) message from the serving base station, the terminal may selectively (or optionally) transmit a handover indication (AAI_HO-IND) message to the serving base station (S202). The terminal may transmit the handover indication message to the serving base station under the following conditions.

1) when the terminal wishes to cancel the handover based upon the conditions decided by the S-ABS 2) when multiple target base stations are included in the AAI_HO-CMD message, and when the terminal select any one of the multiple target base stations 3) when connection is not available to any of the candidate target base stations included in the AAI_HO-CMD message 4) when the connection between the terminal and the serving base station cannot be maintained before the disconnect time expires Subsequently, the terminal performs network re-entry to the target base station (S203).

If EBB handover is performed, or if a scheduling of the serving base station exists before the disconnect time expires, among the network re-entry process steps, the terminal may perform data exchange with the serving base station (S204).

When the network re-entry is completed, the target base station may notify the completion of the handover process to the serving base station (S205), and the terminal may successfully perform data exchange with the target base station (S206).

During the above-described handover process, the terminal transmits the handover request (AAI_HO-REQ) message to the serving base station, so s to initiate the handover process. And, the serving base station transmits a handover command (AAI_HO-CMD) message to the terminal so as to direct (or order) the handover process. At this point, in case the terminal or the serving base station has failed to successfully transmit or receive the handover associated MAC management message, a problem may occur in the handover process.

For example, when the terminal initiates the handover process, the handover process may begin with the transmission of the AAI_HO-REQ message. And, when the terminal receives the AAI_HO-CMD message from the S-ABS, the handover process may be executed (or performed) in full scale. At this point, in case the AAI_HO-CMD message is lost, and in case the terminal is incapable of receiving the AAI_HO-CMD message, the base station may re-transmit the AAI-HO-CMD message, or the terminal may re-transmit the AAI_HO-REQ message. Thus, the stability in the handover process may be ensured so that the handover process can be performed successfully.

However, the femto cell base station has a narrower coverage as compared to the macro base station. Eventually, in a region where multiple neighboring femto base stations exist, the terminal may be capable of performing (or executing) the handover process frequently. However, in case the handover process is performed each time the terminal is located in such region, a considerable amount of delay time may occur. And, accordingly, a considerable amount of radio resource may be wasted in order to perform communication between the terminal and the corresponding base station for the handover process.

DETAILED DESCRIPTION OF THE INVENTION

Technical Objects

An object of the present invention is to provide an efficient communication system and communication method.

Another object of the present invention is to provide a more efficient handover execution method in a situation where multiple neighboring femto base stations exist.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the above-described technical objects of the present invention, according to an embodiment of the present invention, a method for performing handover by a terminal in a radio access system, wherein multiple femto base stations including a serving femto base station form a single group includes the steps of transmitting a request message for requesting a seamless handover within the formed group to the serving femto base station; receiving a first command message from the serving femto base station, the first command message including transmission power information and dedicated uplink resource allocation information being commonly applied to the formed group; broadcasting a predetermined uplink signal, wherein transmission power indicated by the transmission power information through an uplink resource, which is indicated by the dedicated uplink resource allocation information, is applied to the predetermined uplink signal; having each of at least one femto base station included in the group receive a second command message from the serving femto base station, the second command message including a measurement result of the uplink signal; and performing network re-entry to any one target base station among the at least one femto base station.

At this point, the request message may include a handover type field set up to have a value indicating a seamless femto base station handover (SFBS HO).

Also, it is preferable that the multiple femto base stations included in the group correspond to Closed Subscriber Group (CSG) femto base stations or correspond to femto base stations belonging to the same Open Subscriber Group (OSG), and it is also preferable that the multiple femto base stations share context of the terminal.

Additionally, the step of performing network re-entry comprises the steps of transmitting a ranging request message to the target base station; and receiving a ranging response message from the target base station. And, herein, the ranging response message may include a handover (HO) optimization field, wherein the HO optimization field may be set up to have a value indicating a process step that can be omitted from the step of performing network re-entry due to the sharing of the context of the terminal.

Furthermore, the first command message may further include periodicity information according to which the dedicated uplink resource is being allocated, and the step of broadcasting a predetermined uplink signal may be performed at each cycle period indicated by the periodicity information.

In order to achieve the above-described technical objects of the present invention, according to an embodiment of the present invention, in a radio access system, wherein multiple femto base stations form a single group, a method for supporting handover by a terminal by a serving femto base station belonging to the group includes the steps of receiving a request message for requesting a seamless handover within the formed group from the terminal; negotiating at least one of a transmission power, at which a predetermined uplink signal that is to be broadcasted by the terminal, and a dedicated uplink resource for the terminal, with at least one femto base station belonging to the group; transmitting a first command message to the terminal, the first command message including at least one of transmission power information and dedicated uplink resource allocation information based upon the negotiation result; receiving a measurement result from each of the at least one femto base station, each femto base station having measured the uplink signal; and transmitting a second command message to the terminal, the second command message including at least one measurement result.

At this point, the request message may include a handover type field set up to have a value indicating a seamless femto base station handover (SFBS HO).

And, it is preferable that the multiple femto base stations included in the group may correspond to Closed Subscriber Group (CSG) femto base stations or correspond to femto base stations belonging to the same Open Subscriber Group (OSG), and it is also preferable that the multiple femto base stations share context of the terminal.

It is also preferable that the transmission power of the uplink signal and the dedicated uplink resource for the terminal are commonly applied to the multiple femto base stations belonging to the group.

Furthermore, the step of negotiating includes the step of negotiating a cycle period according to which the dedicated uplink resource is being allocated, and, herein, the first command message may further include the negotiated periodicity information.

In order to achieve the above-described technical objects of the present invention, according to a further embodiment of the present invention, a mobile terminal operating in a radio access system, wherein multiple femto base stations including a serving femto base station form a single group, includes a processor; and a wireless communication module (or RF module) configured to transmit and receive radio signals to and from an external source in accordance with a control of the processor. Herein, the processor may control the terminal so as to transmit a request message for requesting a seamless handover within the formed group to the serving femto base station, may receive transmission power information and dedicated uplink resource allocation information being commonly applied to the formed group through a first command message, which is received from the serving femto base station, may control the terminal so as to broadcast a predetermined uplink signal applying transmission power indicated by the transmission power information through an uplink resource, which is indicated by the dedicated uplink resource allocation information, may control the terminal so as to allow each of at least one femto base station included in the group to receive a measurement result of the uplink signal measured by each femto base station through a second command message, which is received from the serving femto base station, and may, then, control the terminal so as to decide any one target base station, which is to perform network re-entry, among the at least one femto base stations.

At this point, it is preferable that the controller sets up a handover type field of the request message to have a value indicating a seamless femto base station handover (SFBS HO).

Also, it is preferable that the multiple femto base stations included in the group correspond to Closed Subscriber Group (CSG) femto base stations or correspond to femto base stations belonging to the same Open Subscriber Group (OSG), and it is also preferable that the multiple femto base stations share context of the terminal.

Additionally, the controller may control the mobile terminal so that a ranging request message can be transmitted to the decided target base station, and so that a ranging response message can be received from the target base station, and wherein the ranging response message includes a handover (HO) optimization field, wherein the HO optimization field is set up to have a value indicating a process step that can be omitted from the step of performing network re-entry due to the sharing of the context of the terminal.

Finally, the first command message may further include periodicity information according to which the dedicated uplink resource is being allocated. And, herein, the controller may control the mobile terminal so that a predetermined uplink signal can be broadcasted at each cycle period indicated by the periodicity information.

Effects of the Invention

According to the above-described method of the present invention, a terminal may efficiently perform a handover in a situation where multiple neighboring femto base stations exist.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

MODE FOR CARRYING OUT THE PRESENT INVENTION

Figure 1:
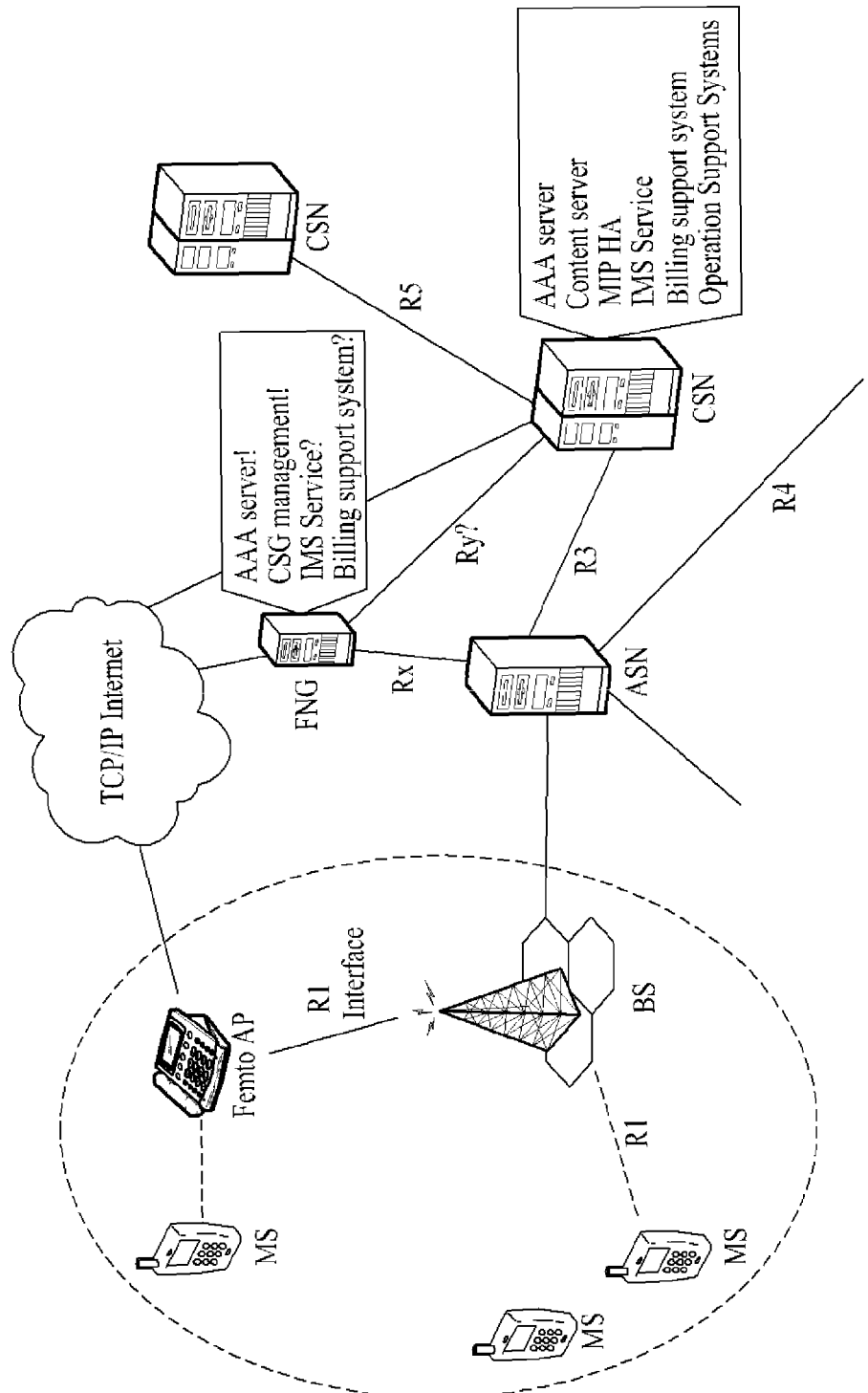
FIG. 1 corresponds to a structural view of a wireless communication system additionally including a femto base station.
Figure 2:
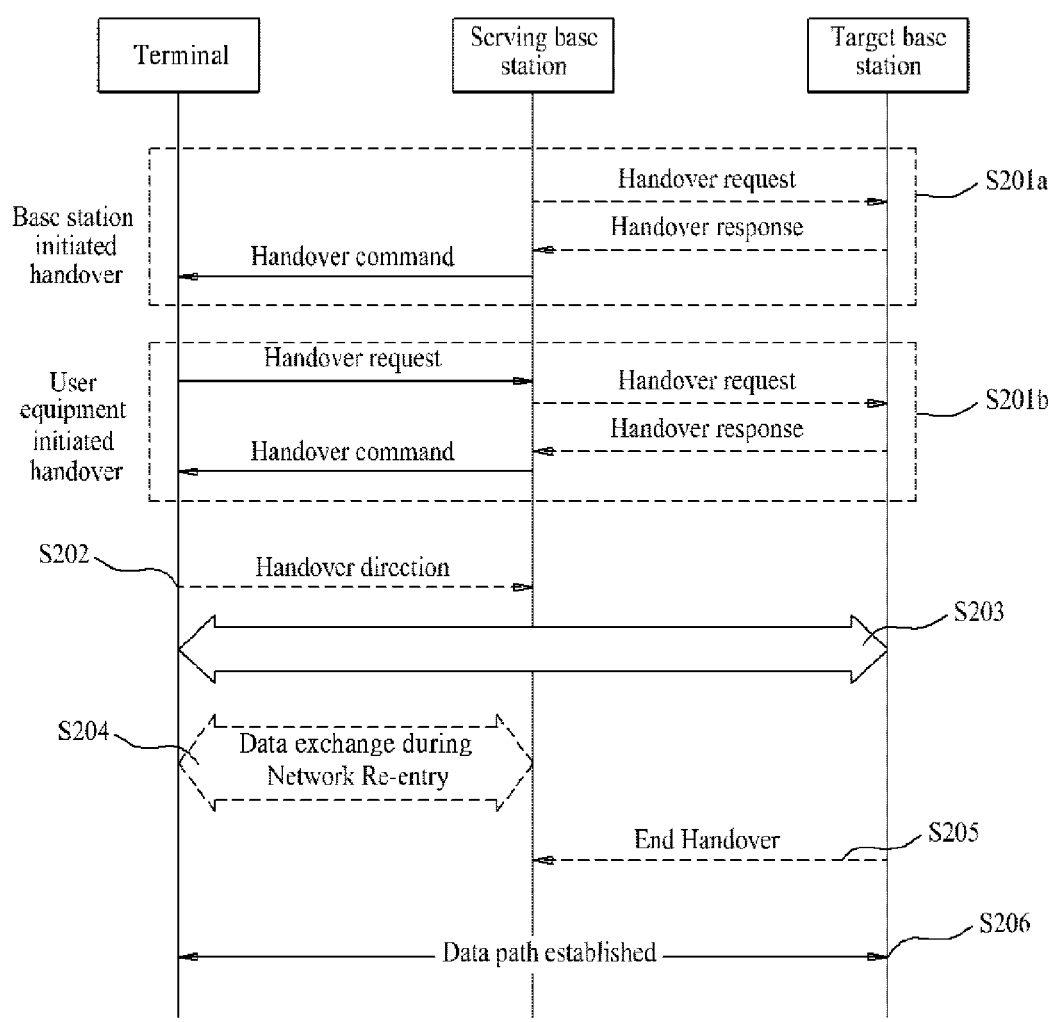
FIG. 2 illustrates an exemplary handover procedure in a general IEEE 802.16m system.

In order to achieve the technical object of the present invention, the present invention discloses a procedure enabling a terminal to perform a more efficient handover in an environment where multiple femto base stations exist and also discloses a device for performing the same.

The embodiments of the present invention described below correspond to a predetermined form of assembly of the elements and characteristics of the present invention. If not mentioned otherwise, each element or characteristic of the present invention may be selectively considered. Also, each element or characteristic of the present invention may also be embodied without being assembled or combined with other elements or characteristics of the present invention. Furthermore, the embodiments of the present invention may be configured by assembling or combining part of the elements and/or characteristics of the present invention. The order of the operations described in the embodiments of the present invention may be altered. And, some of the elements or characteristics of any one embodiment of the present invention may be included in any other embodiment, or may replace the respective element or characteristic of the other embodiment of the present invention.

The specification of the present invention mainly describes the data-transmission and data-reception relation between a base station and a terminal. Herein, the base station has its significance as a terminal node of a network directly performing communication with the terminal. In the description of the present invention, specific operations described to be performed by the base station may also be, in some occasion, performed by an upper node of the base station.

More specifically, it will be apparent that, in a network configured of multiple network nodes, a variety of operations performed in the network in order to communicate with the terminal may be performed by the base station or by other network nodes that do not belong to the base station. At this point, the term 'BS (Base Station)' may also be replaced with other terms, such as a fixed station, Node B, eNode B (eNB), AP (Access Point), ABS (Advanced BS), and so on. Furthermore, the term 'Terminal' may be replaced with other terms, such as UE (User Equipment), MS (Mobile Station), MSS (Mobile Subscriber Station), AMS (Advanced MS), SS (Subscriber Station), or mobile terminal.

The embodiments of the present invention may be realized by a variety of means. For example, the embodiments of the present invention may be realized as hardware, firmware, or software, or in a combined form of two or more of hardware, firmware, and software.

When configuring the embodiment of the present invention in the form of hardware, a method according to the embodiments of the present invention may be realized by using one or more of ASICs (application specific integrated circuits), DSPs (digital signal processors), DSPDs (digital signal processing devices), PLDs (programmable logic devices), FPGAs (field programmable gate arrays), a processor, a controller, a micro-processor, a micro-controller, and so on.

When configuring the embodiment of the present invention in the form of firmware or software, a method according to the embodiments of the present invention may be realized in the form of a module, procedure, or mathematical function performing the functions or operations described in the specification of the present invention. A software code may be stored in a memory unit so as to be configured by a processor. The memory unit may be placed inside or outside of the processor, thereby being capable of sending and receiving data with the processor through a variety of previously disclosed means.

The embodiments of the present invention may be supported by standard documents disclosed in at least one of the wireless access systems, the 802 system, the 3GPP system, the 3GPP LTE system, and the 3GPP2 system. More specifically, among the embodiments of the present invention, steps or part of the present invention that have not been described in order to clearly disclose the technical scope and spirit of the present invention, may be supported by the above-mentioned documents. All terms disclosed in the description of the present invention may be described by the above-mentioned documents. Particularly, the embodiments of the present invention may be supported by at least one or more standard documents of the IEEE 802.16 system, such as document P802.16-2004, document P802.16e-2005, document P802.16Rev2, and document IEEE P802.16m.

The specific terms used in the description of the present invention are merely provided to help and facilitate the understanding of the present invention. The usage of such term may vary within the technical scope and spirit of the present invention.

In the present invention, it will be assumed that the terminal is located in a region where multiple neighboring femto base stations exist, and it will also be assumed that a handover among the femto base stations occur quite frequently as the terminal relocates itself within the corresponding region. Additionally, it is also assumed that the multiple femto base stations are interconnected to one another by a backhaul, thereby being capable of exchanging backhaul messages to and from one another.

Generally, in a situation where a neighboring femto base station does not exist, the terminal is provided with services from the macro base station. However, in a situation where a neighboring femto base station exists, the channel state between the terminal and the femto base station is generally better than the channel state between the terminal and the macro base station. In such situation, since it is more efficient to be provided with services from the femto base station, the terminal may prefer being provided with services from the femto base station. Eventually, in order to be provided with services under better circumstances, in an environment where multiple neighboring femto base stations exist, handover may be performed among the multiple femto base stations. However, frequent handovers may cause a problem of time delay caused by the execution of the handover procedure, and a waste in radio resources caused by a MAC message, which is exchanged between the terminal and the serving base station and/or the target base station, during the process of executing the handover procedure.

Therefore, as a method for simplifying the handover procedure, the exemplary embodiment of the present invention proposes a method for forming a single group by grouping femto base stations belonging to a predetermined region, sharing context (or connection information) of the terminal with each of the femto base stations within the corresponding group, and having the terminal broadcast a predetermined signal to an uplink resource region, which is negotiated upon (or decided) by the femto base stations.

Hereinafter, in the description of the present invention, the type of the handover execution method according to the exemplary embodiment of the present invention, which will be described later on, will be referred to as an SFBS HO (Seamless Femto BS HandOver) for simplicity.

Also, the group configured of the femto base stations within the above-described predetermined region will be referred to as an "active set", and, within the active set, a serving femto base station of the terminal will be referred to as an "Anchor BS". Eventually, since the handover indicates a change in the serving base station, in the description of the present invention, the handover within the active set may have the same meaning as a change in the anchor base station.

At this point, it will be preferable that the active set is configured of femto base stations belonging to an OSG or a CSG having the same group configuration. More specifically, with respect to the terminal, it will be preferable that the femto base stations belonging to the OSG or femto base stations belonging to the CSG group, in which the terminal itself is a CSG member, configure an active set. This is because, in order to execute handover, the terminal should always be ready for access. Information on whether or not the corresponding femto base station supports the active set may be known by the terminal through broadcast information, such as a neighbor disclose (AAI_NBR-ADV) message or a super frame header, or through a MAC management message exchange, which is exchanged during a network initial entry/re-entry procedure.

Hereinafter, a base station alignment format assumed by the present invention will be described in detail with reference to FIG. 3.

Figure 3:
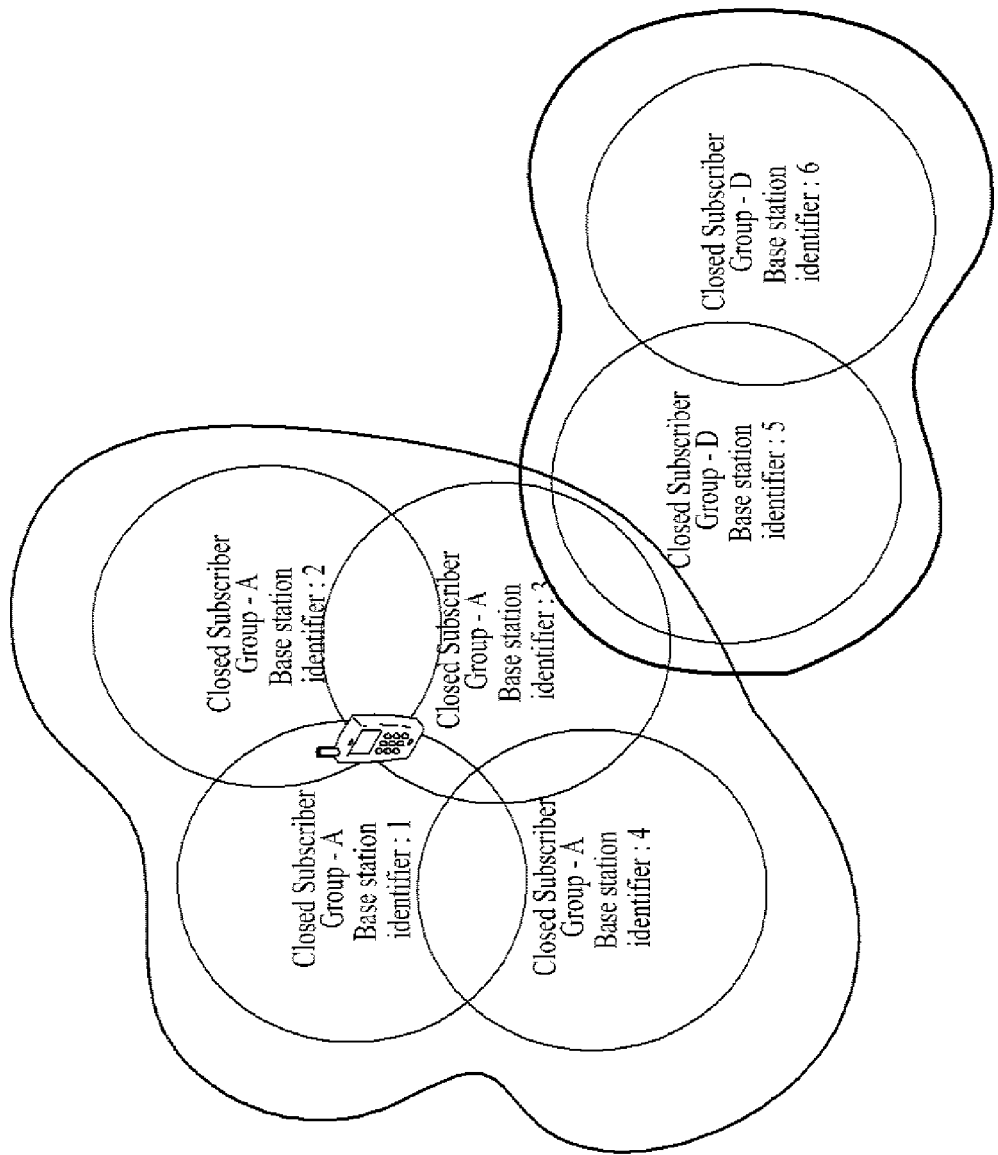
FIG. 3 illustrates an exemplary geographical alignment of femto base stations within a region where the terminal is positioned according to an exemplary embodiment of the present invention.

FIG. 3 illustrates an exemplary geographical alignment of femto base stations within a region where the terminal is positioned according to an exemplary embodiment of the present invention.

Referring to FIG. 3, 4 femto base stations (base station identifiers 1 to 4) belonging to Closed Subscriber Group (CSG) A are adjacent to one another so as to form a single active set. And, femto base stations (base station identifiers 5 and 6) belonging to Closed Subscriber Group (CSG) D are adjacent to one another so as to form another single active set.

In the alignment situation of the femto base stations shown in FIG. 3, it will be assumed that the terminal shifts from a femto base station corresponding to base station identifier 1 to a femto base station corresponding to base station identifier 2. At this point, it is assumed that the terminal (station identifier 5) corresponds to a CSG member of the Closed Subscriber Group A. In this case, the method for executing handover according to the present invention will be described in detail with reference to FIG. 4.

Figure 4:
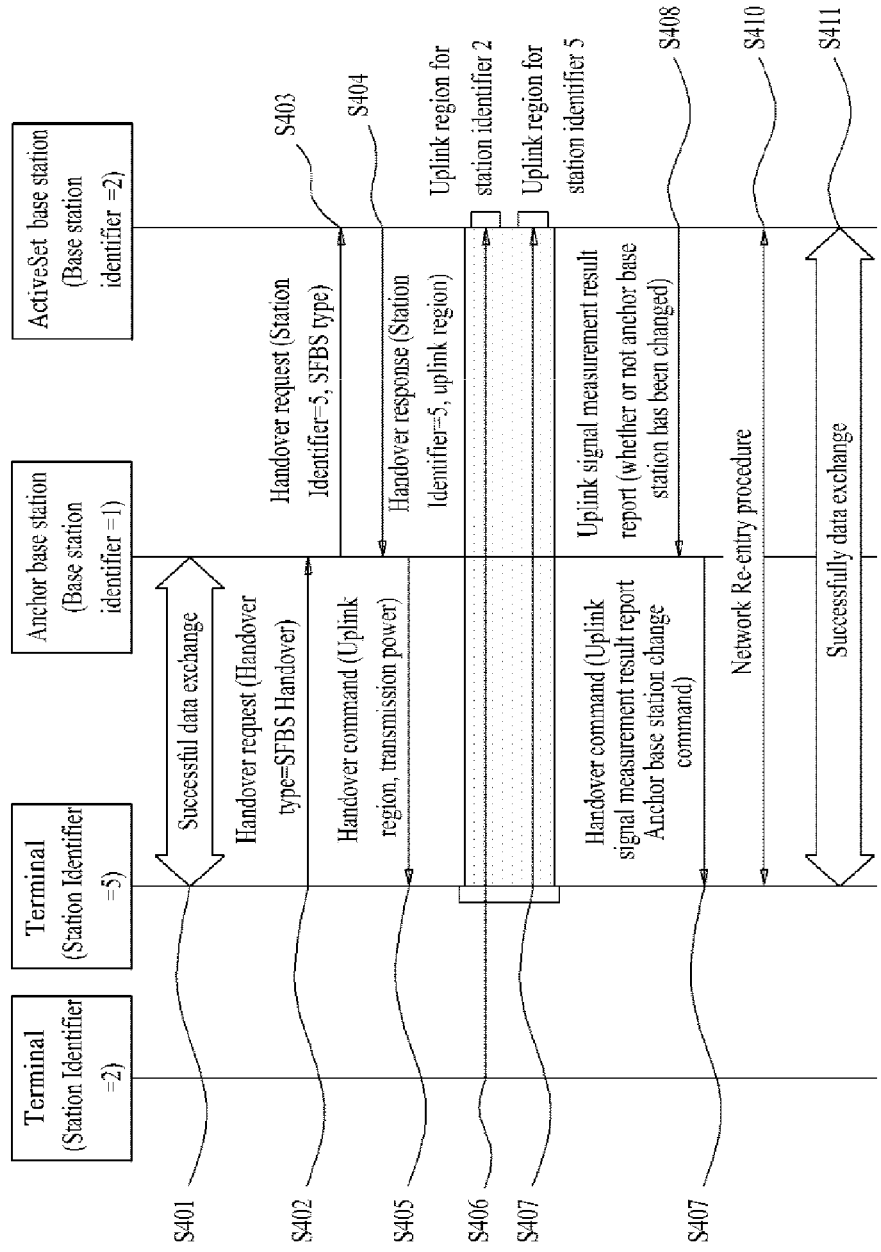
FIG. 4 illustrates exemplary process steps according to which the handover process is executed according to an exemplary embodiment of the present invention.

FIG. 4 illustrates exemplary process steps according to which the handover process is executed according to an exemplary embodiment of the present invention.

Referring to FIG. 4, it will be assumed that the terminal having the station identifier value of 2 has already performed the handover execution procedure according to the exemplary embodiment of the present invention. And, it will also be assumed that the terminal having the station identifier value of 5 has newly initiated a handover by using the active set.

First of all, the terminal having the station identifier value of 5 is registered to the femto base station having the base station identifier of 1 (i.e., the anchor base station), thereby being successfully provided with services (S401).

At this point, the terminal may decide whether or not to perform handover based upon a predetermined decision standard. For example, by using a neighbor disclose message or by performing scanning, when the terminal determines that multiple neighboring femto base stations exist around the region in which the terminal is currently located, and, accordingly, when the terminal determines that the current anchor base station supports the SFBS HO respective to the active set, the terminal may transmit a handover request (AAI_HO-REQ) message, wherein SFBS HO is set as the handover type (S402), Accordingly, the anchor base station may notify the femto base stations, which belong to the same active set as the anchor base station, that the terminal having the station identifier of 5 has requested an SFBS HO type handover through a backbone network message (e.g., HO-REQ) (S403).

By using the backbone network, the base stations included in the active set agrees upon (or negotiates) the uplink resource region that is to be commonly allocated to the terminal, which has requested the SFBS handover, and, then, the femto base stations may deliver the station identifier of the corresponding terminal and the decided uplink resource region information to the anchor base station (S404).

At this point, it is preferable that the uplink resource region being allocated to the terminal is commonly applied to all base stations included in the active, and it is also preferable that the allocated uplink resource region is an allocated region dedicated only to the corresponding terminal.

Although it is shown in FIG. 4 that only the femto base station having the base station identifier value of 2 is included in the active set as the base station other than the anchor base station included in the active set, a larger number of base stations may exchange backbone network messages with the anchor base station.

The anchor base station may then notify the uplink resource region allocated to the terminal to the terminal through a handover associated message (e.g., handover command: AAI_HO-CMD) (S405).

If the allocated uplink resource is periodically allocated to the terminal, information associated to the allocation cycle period (or periodicity) may be further included in the corresponding message.

At this point, transmission power (Tx power) information may be further included in the handover command message. The transmission power information may correspond to a value notified in advance to the active set, or the transmission power information may correspond to a value that is decided (negotiated) based upon an agreement between the femto base stations included in the active set.

Thereafter, the terminal broadcasts the pre-determined signal to the allocated uplink resource region at the transmission power included in the handover command message. The pre-determined signal may correspond to any one of a predetermined preamble, code, and message (S407).

Since the signal broadcasted by the terminal corresponds to a region commonly allocated to all femto base stations included in the active set, all base stations included in the active set may receive the corresponding signal and may measure a reception state of the signal.

Active set base stations that have determined the reception state of the signal broadcasted by the terminal respectively transmit to the anchor base station the measured signal information to the anchor base station (S408). At this point, among the anchor base stations, an active set base station, which has determined that the reception state of the signal transmitted from the terminal is sufficiently good, and which has favorable load state, may request to be newly assigned (or changed) as the anchor base station of the corresponding terminal.

The anchor base station respective to the terminal, which has received the measurement state information of the signal measured by the active set base stations, may notify the measurement result to the terminal by using a predetermined message (e.g., AAI_HO-CMD) (S409).

At this point, when an active set base station has requested to be newly assigned as the anchor base station of the terminal, the anchor base station may include the corresponding information in the handover command message. Also, the anchor base station may recommend an active set base station having the most favorable signal measurement result through the corresponding message.

After receiving the signal measurement result information from the anchor base station, the terminal may perform a network re-entry procedure to the active set femto base station having the most favorable signal measurement result, or to the active set femto base station having requested an anchor base station change so as to be newly assigned as the anchor base station (S410).

Prior to performing the network re-entry procedure, the terminal may notify the anchor base station of the active set base station, to which the current anchor base station is to perform network re-entry, through a handover indication (AAI-HO-IND) message (not shown).

The network re-entry procedure may be performed in the form of a ranging request/response message exchange. And, since the active set base station shares the context of the terminal, the process steps that may be omitted from the network re-entry procedure may be notified to the terminal through a handover optimization parameter of the ranging response (AAI_RNG-RSP) message.

By using the above-described handover method, the terminal is no longer required to scan each and every target base station in order to perform the handover procedure. Also, with a single handover associated message (HO-REQ/HO-CMD) exchange between the terminal and the anchor base station, even when situations requiring frequent handover procedures occur later on, optimal handover procedures may be performed by using a minimum number of process steps. Therefore, services may be efficiently provided in an environment including a large number of femto base stations.

Furthermore, the terminal may use the uplink resource region that has been allocated once so as to periodically transmit an uplink signal. Then, the terminal may request other active set base stations to measure the signal transmitted by the terminal itself. Accordingly, an active set base station that has been determined to have the best signal measurement result may request the current anchor base station for a change in the anchor base station. For example, referring to FIG. 4, an uplink signal transmitted by the terminal having the station identifier value of 2 may be periodically transmitted to the uplink resource region, which is allocated to the terminal after requesting a previous SFBS type handover procedure once (or one time) to its anchor base station (S406).

Structures of the User Equipment and the Base Station

Hereinafter, as another embodiment of the present invention, the mobile station and base station (FBS and MBS) wherein the above-described embodiments of the present invention may be performed will now be described in detail.

The mobile station may operate as a transmitter in the uplink and may operate as a receiver in the downlink. Also, the base station may operate as a receiver in the uplink and may operate as a transmitter in the downlink. More specifically, the mobile station and the base station may include a transmitter and a receiver so as to transmit information or data.

The transmitter and the receiver may include a processor, a module, a part and/or means for performing the embodiments of the present invention. Particularly, the transmitter and the receiver may include a module (or means) for encoding (or encrypting) a message, a module for interpreting an encoded (or encrypted) message, an antenna for transmitting and receiving messages, and so on. An example of such transmitting end and receiving end will be described in detail with reference to FIG. 5.

Figure 5:
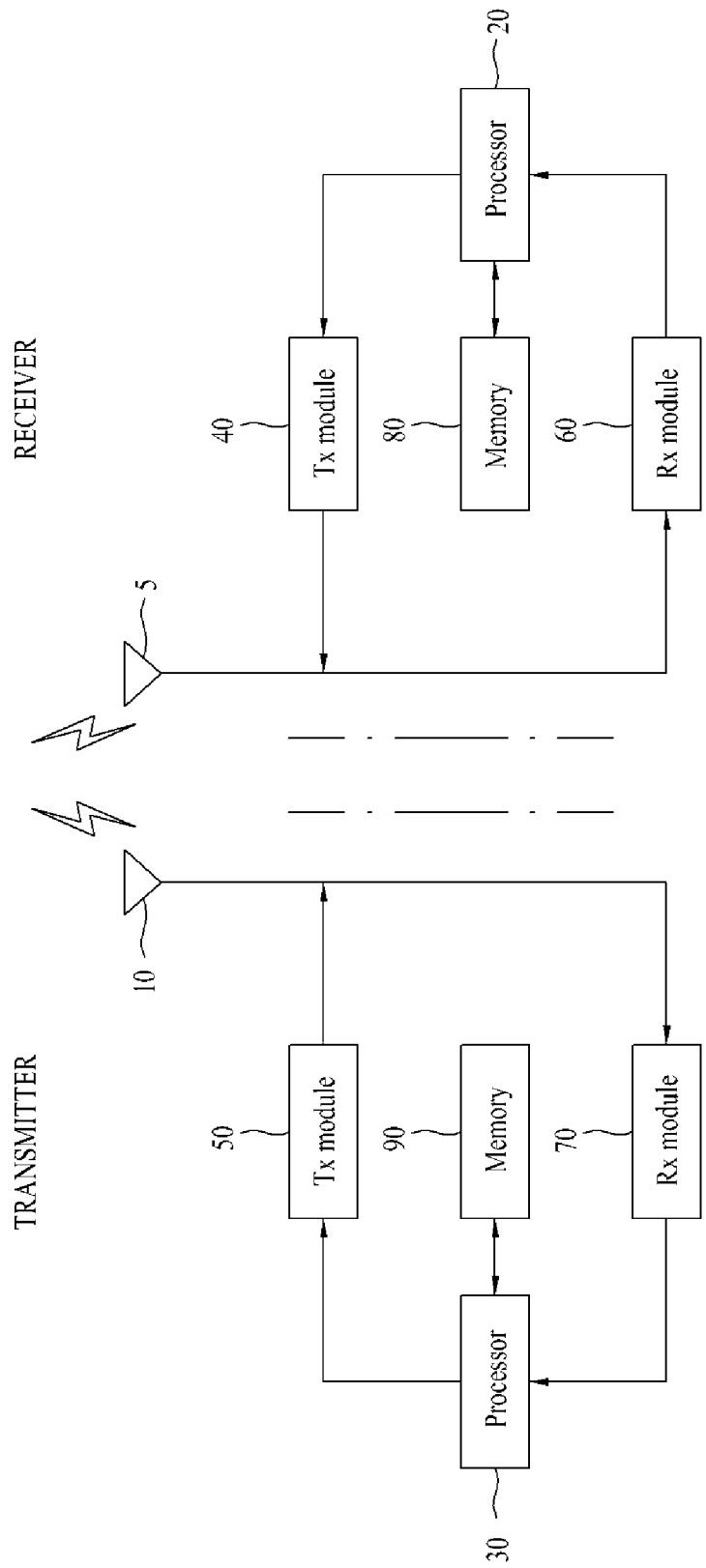
FIG. 5 illustrates a block view showing exemplary structures of a transmitter and a receiver according to yet another embodiment of the present invention.

FIG. 5 illustrates a block view showing exemplary structures of a transmitter and a receiver according to yet another embodiment of the present invention.

Referring to FIG. 5, the left side represents the structure of the transmitter, and the right side represents the structure of the receiver. Each of the transmitter and the receiver may include an antenna (5, 10), a processor (20, 30), a transmission module (Tx module) (40, 50), a receiving module (Rx module) (60, 70), and a memory (80, 90). Each element may perform its corresponding function. Hereinafter, each element will now be described in detail.

The antenna (5, 10) either transmits a signal created from the Tx module (40, 50) to the outside, or receives a wireless signal from the outside, thereby delivering the received signal to the Rx module (60, 70). When a Multiple-Input Multiple-Output (MIMO) antenna function is supported, at least 2 or more antennae may be provided herein.

The antenna, the transmission module, and the reception module may collectively configure a radio frequency (RF) module.

The processor (20, 30) generally controls the overall operations of the whole mobile terminal (or user equipment). For example, the processor may perform a controller function for performing the above-described embodiments of the present invention, a MAC (Medium Access Control) frame variable control function based upon service characteristics and frequency environment (or condition), a hand over function, and authentication and encoding (or encryption) functions. More specifically, the processor (20, 30) may perform an overall control for performing the procedures related to the above-described random access.

Most particularly, the processor of the mobile terminal may determine the type of the neighboring base station and may also determine whether or not SFBS HO support is provided by the serving femto base station, and the processor of the mobile terminal may request the serving femto base station of the SFBS type handover. Thereafter, the processor of the mobile terminal may receive (or acquire) transmission power information and dedicated uplink resource region information, which is commonly applied to the active set, from the serving femto base station. The processor of the mobile terminal may control the wireless communication module so as to broadcast a predetermined signal to an uplink resource region indicated by the uplink resource region information by using the acquired (or received) transmission power. When the serving femto base station transmits a signal measurement result of other active set base stations, the processor of the mobile terminal may use the transmitted signal measurement result so as to perform network re-entry to an active set base station having the most excellent signal measurement result, or to an active set base station having requested a handover procedure.

Moreover, the processor of the mobile terminal may perform the overall control operations of the operation steps disclosed in the above-described exemplary embodiments of the present invention.

The Tx module (40, 50) may perform predetermined coding and modulation processes on the data scheduled by the processor (20, 30) and to be transmitted to the outside, thereby delivering the processed data to the antenna (10).

The Rx module (60, 70) may perform decoding and demodulation processes on a wireless signal received from the outside through the antenna (5, 10), so as to recover the processed data to the original (or initial) state, thereby delivering the recovered data to the processor (20, 30).

A program for processing and controlling the processor (20, 30) may be stored in the memory (80, 90). The memory (80, 90) may also perform functions for temporarily storing input/output data. Furthermore, the memory (80, 90) may include at least one type of storage means, such as a flash memory type, a hard disk type, a multimedia card micro type, a card-type memory (e.g., SD or XD memory), a RAM (Random Access Memory), a SRAM (Static Random Access Memory), a ROM (Read-Only Memory), an EEPROM (Electrically Erasable Programmable Read-Only Memory), a PROM (Programmable Read-Only Memory), a magnetic memory, a magnetic disk, and an optical disk.

Meanwhile, the base station may perform a controller function for performing the above-described embodiments of the present invention, an OFDMA (Orthogonal Frequency Division Multiple Access) packet scheduling, TDD (Time Division Duplex) packet scheduling, and channel multiplexing functions, MAC frame variable control function based upon service characteristics and frequency environment (or condition), a high-speed traffic real-time control function, a hand over function, authentication and encoding (or encryption) functions, packet modulation/demodulation functions for transmitting data, a high-speed channel coding function, and a real-time modem control function through at least one of the above-described modules, or the base station may further include a separate means, module, or part for performing such functions.

It will be apparent to those skilled in the art that various modifications and variations can be made in the present invention without departing from the technical and essential spirit or scope of the invention. Therefore, the detailed description of the present invention should not be interpreted as limiting in all aspects of the present invention, but should be considered as exemplary. The scope of the appended claims of the present invention shall be decided based upon rational interpretation, and all modifications within the scope of the appended claims and their equivalents will be included in the scope of the present invention.

Industrial Applicability

In the above-described broadband radio access system, a more efficient method for executing handover and a terminal structure for the same has been described based upon an example being applied to an IEEE802.16m system. However, in addition to the IEEE802.xx systems, the present invention may also be applied to other various types of mobile communication systems, such as 3GPP/3GPP2.

What is claimed is:

1. A method for performing handover carried out by a terminal in a radio access system, wherein multiple femto base stations including a serving femto base station form a single group, the method comprising:

transmitting a request message for requesting a seamless handover within the formed group to the serving femto base station;

receiving a first command message from the serving femto base station, the first command message including transmission power information and dedicated uplink resource allocation information being commonly applied to the formed group;

broadcasting a predetermined uplink signal, wherein transmission power indicated by the transmission power information through an uplink resource, which is indicated by the dedicated uplink resource allocation information, is applied to the predetermined uplink signal;

receiving a second command message from the serving femto base station, the second command message including measurement results of the uplink signal measured by each of at least one femto base station included in the group; and performing network re-entry to a target base station among the at least one femto base station, wherein the multiple femto base stations included in the group correspond to Closed Subscriber Group (CSG) femto base stations or correspond to femto base stations belonging to the same Open Subscriber Group (OSG), and wherein the multiple femto base stations share context of the terminal, wherein the performing the network re-entry comprises:
      transmitting a ranging request message to the target base station; and
      receiving a ranging response message from the target base station, and wherein the ranging response message includes a handover (HO) optimization field, the HO optimization field being set up to have a value indicating a process step that can be omitted from performing the network re-entry due to the sharing of the context of the terminal.

2. The method of claim 1, wherein the request message includes a handover type field set up to have a value indicating a seamless femto base station handover (SFBS HO).

3. The method of claim 1, wherein the first command message further includes periodicity information according to which the dedicated uplink resource is being allocated, and wherein the step of broadcasting a predetermined uplink signal is performed at each cycle period indicated by the periodicity information.

4. A method for supporting handover of a terminal carried out by a serving femto base station which belongs to a group comprising multiple femto base stations sharing context of the terminal in a radio access system, the method comprising:

receiving a request message for requesting a seamless handover within the formed group from the terminal;

negotiating at least one of a transmission power, at which a predetermined uplink signal that is to be broadcasted by the terminal, and a dedicated uplink resource for the terminal, with at least one femto base station belonging to the group;

transmitting a first command message to the terminal, the first command message including at least one of transmission power information and dedicated uplink resource allocation information based upon the negotiation;

receiving a measurement result from each of the at least one femto base station, each femto base station having measured the uplink signal; and transmitting a second command message to the terminal, the second command message including at least one measurement result received from the at least one femto base station, wherein the terminal performs network re-entry to a target base station among the at least one femto base station by transmitting a ranging request message to the target base station and receiving a ranging response message from the target base station, and wherein the ranging response message includes a handover (HO) optimization field, the HO optimization field being set up to have a value indicating a process step that can be omitted from performing the network re-entry due to the sharing of the context of the terminal.

5. The method of claim 4, wherein the request message includes a handover type field set up to have a value indicating a seamless femto base station handover (SFBS HO).

6. The method of claim 4, wherein the multiple femto base stations included in the group correspond to Closed Subscriber Group (CSG) femto base stations or correspond to femto base stations belonging to the same Open Subscriber Group (OSG).

7. The method of claim 4, wherein the transmission power of the uplink signal and the dedicated uplink resource for the terminal are commonly applied to the multiple femto base stations belonging to the group.

8. The method of claim 4, wherein the step of negotiating comprises:

negotiating a cycle period according to which the dedicated uplink resource is being allocated, and wherein the first command message further includes the negotiated periodicity information.

9. A mobile terminal operating in a radio access system, wherein multiple femto base stations including a serving femto base station form a single group, the mobile terminal comprising:

a processor; and a wireless communication module (or RF module) configured to transceive radio signals externally in accordance with a control of the processor, wherein the processor is configured to:

control a request message for requesting a seamless handover within the formed group to be transmitted to the serving femto base station;

obtain transmission power information and dedicated uplink resource allocation information being commonly applied to the formed group through a first command message received from the serving femto base station;

control a predetermined uplink signal applying transmission power indicated by the transmission power information to be broadcast through an uplink resource indicated by the dedicated uplink resource allocation information;

control a second command message to be received from the serving femto base station, the second command message including measurement results of the uplink signal measured by each of at least one femto base station included in the group; and determine a target base station for performing network re-entry among the at least one femto base station, wherein the multiple femto base stations included in the group correspond to Closed Subscriber Group (CSG) femto base stations or correspond to femto base stations belonging to the same Open Subscriber Group (OSG), and wherein the multiple femto base stations share context of the mobile terminal, wherein the controller is further configured to control the mobile terminal such that a ranging request message can be transmitted to the determined target base station and a ranging response message can be received from the target base station, and wherein the ranging response message includes a handover (HO) optimization field, the HO optimization field being set up to have a value indicating a process step that can be omitted from performing network re-entry due to the sharing of the context of the mobile terminal.

10. The mobile terminal of claim 9, wherein the controller sets up a handover type field of the request message to have a value indicating a seamless femto base station handover (SFBS HO).

11. The mobile terminal of claim 9, wherein the first command message further includes periodicity information according to which the dedicated uplink resource is being allocated, and wherein the controller controls the mobile terminal so that a predetermined uplink signal can be broadcasted at each cycle period indicated by the periodicity information.

* * * * *